United States Patent [19]
Doi et al.

[11] 4,172,046
[45] Oct. 23, 1979

[54] EMULSIFIER COMPOSITION FOR ASPHALT EMULSION

[75] Inventors: Tadashi Doi, Osaka; Isao Sekido, Wakayama, both of Japan

[73] Assignee: Kao Soap Co., Ltd., Tokyo, Japan

[21] Appl. No.: 888,360

[22] Filed: Mar. 20, 1978

[30] Foreign Application Priority Data

Mar. 24, 1977 [JP] Japan .................................. 52-32692

[51] Int. Cl.² ...................... B01J 13/00; B01F 17/16
[52] U.S. Cl. ................................ 252/311.5; 252/357; 106/277
[58] Field of Search ............................ 252/357, 311.5; 106/277

[56] References Cited

U.S. PATENT DOCUMENTS

| | | | |
|---|---|---|---|
| 2,886,458 | 5/1959 | Ceintrey | 106/277 |
| 3,728,278 | 4/1973 | Tramelli | 106/277 X |
| 3,738,852 | 6/1973 | Doi et al. | 252/311.5 X |

*Primary Examiner*—Benjamin R. Padgett
*Assistant Examiner*—E. Suzanne Parr
*Attorney, Agent, or Firm*—Blanchard, Flynn, Thiel, Boutell & Tanis

[57] ABSTRACT

An emulsifier composition suitable for preparing an asphalt emulsion comprises a monoamine having an aliphatic hydrocarbon group having 8 to 22 carbon atoms, a diamine having an aliphatic hydrocarbon group having 8 to 22 carbon atoms and a polyamine having an aliphatic hydrocarbon group having 8 to 22 carbon atoms and containing 3 to 6 amino groups, wherein the average number of amino groups contained therein is at least 1.7.

9 Claims, No Drawings

EMULSIFIER COMPOSITION FOR ASPHALT EMULSION

BACKGROUND OF THE INVENTION

1. Field of the Invention

The present invention relates to an emulsifier for an asphalt emulsion which comprises a monoamine having an aliphatic hydrocarbon group having 8 to 22 carbon atoms, a diamine having an aliphatic hydrocarbon group having 8 to 22 carbon atoms and a polyamine having an aliphatic hydrocarbon group having 8 to 22 carbon atoms and containing 3 to 6 amino groups, at a specific mixing ratio.

2. Description of Prior Arts

As emulsifiers for the production of cationic asphalt emulsions, there have heretofore been used, for example, beef tallow propylene diamine, hardened beef tallow propylene diamine, ethylene oxide adducts thereof, 1-aminoethyl-2-heptadecenylimidazoline-2, stearyl-trimethyl ammonium chloride and aminated lignin. Recently, however, the asphalts used and the traffic environments have changed, and development of new emulsifiers coping with these changes has been desired. More specifically, the importance of an asphalt emulsion as a binder for treating the pavement surface has been increasing but with the increase of the traffic volume, an asphalt having a reduced penetration, namely a hard asphalt, has been desired. Conventional straight asphalt formed as a distillation residue of crude oil is now being substituted by an asphalt obtained by softening with a flux a very hard asphalt formed by the propane deasphalting method. An emulsifier applicable to these varying materials is required to have a certain latitude in the emulsifying capacity. More specifically, it has been clarified that an emulsifier comprising a plurality of emulsifier components is preferable to an emulsifier composed of a single component. However, an emulsifier composition having an excellent emulsifying capacity to the above-mentioned asphalt having a low penetration has not been developed.

SUMMARY OF THE INVENTION

The present invention is intended to solve this problem, and it is a primary object of the present invention to provide a ternary emulsifier having an excellent emulsifying capacity not only to conventional straight asphalts but also to asphalts having a low penetration.

The emulsifier of the present invention is characterized not only by a high emulsifying capacity but also in that the viscosity of an asphalt emulsion can be adjusted with an amount of an acid that is used for the production of the asphalt emulsion. In other words, the viscosity of the asphalt emulsion should not be adjusted by controlling the amounts of asphalt or other additives (thickener and the like) so as to allow the asphalt emulsion to penetrate among spaces of an aggregate.

More specifically, in accordance with the present invention, there is provided an emulsifier for an asphalt emulsion which comprises a monoamine having an aliphatic hydrocarbon group having 8 to 22 carbon atoms, a diamine having an aliphatic hydrocarbon group having 8 to 22 carbon atoms and a polyamine having an aliphatic hydrocarbon group having 8 to 22 carbon atoms and containing 3 to 6 amino groups, wherein the average number of amino groups contained in the composition of the emulsifier is at least 1.7.

In the present invention, it is preferred to use a compound represented by the following general formula:

$$R-NH_2 \tag{I}$$

wherein R stands for an alkyl or alkenyl group having 8 to 22 carbon atoms, as the monoamine having an aliphatic hydrocarbon group having 8 to 22 carbon atoms. As specific examples of such compound, there can be mentioned octyl amine, lauryl amine, myristyl amine, palmityl amine, stearyl amine, oleyl amine, behenyl amine and beef tallow amine.

In the present invention, it is preferred to use a compound represented by the following general formula:

$$R-N(H)-(CH_2)_n-NH_2 \tag{II}$$

wherein R stands for an alkyl or alkenyl group having 8 to 22 carbon atoms and n is an integer of 2 or 3, as the diamine having an aliphatic hydrocarbon group having 8 to 22 carbon atoms. As specific examples of such compound, there can be mentioned octyl propylene diamine, lauryl propylene diamine, myristyl propylene diamine, palmityl propylene diamine, stearyl propylene diamine, behenyl propylene diamine, beef tallow propylene diamine, lauryl ethylene diamine, myristyl ethylene diamine and stearyl ethylene diamine.

In the present invention, it is preferred to use a compound represented by the following general formula:

$$R-N(H)-(R'NH)_n-H \tag{III}$$

wherein R stands for an alkyl or alkenyl group having 8 to 22 carbon atoms, R' stands for an alkylene group having 2 or 3 carbon atoms and n is an integer of from 2 to 5, or

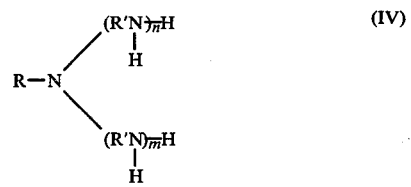

wherein R stands for an alkyl or alkenyl group having 8 to 22 carbon atoms, R' stands for an alkylene group having 2 or 3 carbon atoms, and n and m each are an integer of from 1 to 4, as the polyamine having an aliphatic hydrocarbon group having 8 to 22 carbon atoms and containing 3 to 6 amino groups. As specific examples of such compound, there can be mentioned triamines such as octyl dipropylene triamine, lauryl dipropylene triamine, myristyl dipropylene triamine, stearyl dipropylene triamine, behenyl dipropylene triamine, beef tallow dipropylene triamine, lauryl diethylene triamine, palmityl diethylene triamine, stearyl diethylene triamine, octyl bis-aminopropyl amine, lauryl bis-aminopropyl amine, myristyl bis-aminopropyl amine, stearyl bis-aminopropyl amine, behenyl bis-aminopropyl amine and beef tallow bis-aminopropyl amine, tetraamines such as octyl tripropylene tetraamine, lauryl tripropylene tetraamine, myristyl tripropylene tetraamine, palmityl tripropylene tetraamine, stearyl tripropylene tetraamine, behenyl tripropylene tetraamine, oleyl tripropylene tetraamine, beef tallow tripropylene tetraamine, octyl triethylene tetraamine, lauryl triethylene tetraamine, myristyl triethylene tetraamine, palmityl triethylene tetraamine, stearyl triethylene tetraamine, behenyl triethylene tetraamine, oleyl triethylene tetraamine, beef tallow triethylene tetraamine, N-octylaminopropyl N'-bis-aminopropyl propylene diamine, N-laurylaminopropyl N'-bis-aminopropyl propylene diamine, N-myristylaminopropyl N'-bis-aminopropyl propylene diamine, N-palmitylaminopropyl N'-bis-aminopropyl propylene diamine, N-stearylaminopropyl N'-bis-aminopropyl propylene diamine, N-behenylaminopropyl N'-bis-aminopropyl propylene diamine, N-oleylaminopropyl N'-bis-aminopropyl propylene diamine and N-beef tallow-aminopropyl N'-bis-aminopropyl propylene diamine, pentaamines such as octyl tetrapropylene pentaamine, lauryl tetrapropylene pentaamine, myristyl tetrapropylene pentaamine, palmityl tetrapropylene pentaamine, stearyl tetrapropylene pentaamine, behenyl tetrapropylene pentaamine, oleyl tetrapropylene pentaamine and beef tallow tetrapropylene pentaamine, and hexaamines such as octyl pentapropylene hexaamine, lauryl pentapropylene hexaamine, myristyl pentapropylene hexaamine, palmityl pentapropylene hexaamine, stearyl pentapropylene hexaamine, behenyl pentapropylene hexaamine, oleyl pentapropylene hexaamine and beef tallow pentapropylene hexaamine. These amines can easily be prepared by using a monoamine or diamine as the starting compound and performing stepwise addition of acrylonitrile and reduction of the adduct. Further, polyamines can easily be prepared by reacting a diethylene triamine or triethylene tetraamine with a higher fatty acid chloride such as stearyl chloride.

By the term "average number of amino groups" referred to in the present invention is meant an average value of the amino groups contained in the emulsifier, which is represented by the following formula:

$$\Sigma A \times A_n$$

wherein A stands for the weight % of the component A in the emulsifier and $A_n$ stands for the number of amino groups of the component A.

For example, the average number of amino groups is calculated in the following manner.

In case of an emulsifier comprising 40 parts by weight of a monoamine, 50 parts by weight of a propylene diamine and 10 parts by weight of a dipropylene triamine, the average number of amino groups is calculated as follows:

$$(0.4 \times 1) + (0.5 \times 2) + (0.1 \times 3) = 1.7$$

The emulsifier of the present invention for an asphalt emulsion comprises a monoamine having an aliphatic hydrocarbon group having 8 to 22 carbon atoms, a diamine having an aliphatic hydrocarbon group having 8 to 22 carbon atoms and a polyamine having an aliphatic hydrocarbon group having 8 to 22 carbon atoms and containing 3 to 6 carbon atoms, wherein the average number of amino groups contained in the composition of the emulsifier is at least 1.7. The limitation of this mixing ratio has been set as a result of investigations as to whether or not the emulsifier is homogeneously dispersed or dissolved in warm water maintained at about 60° to about 80° C., or whether or not an asphalt emulsion, formed by adding a monobasic acid such as hydrochloric acid, acetic acid or the like to a homogeneous solution or dispersion when the emulsifier is homogeneously dissolved or dispersed in such warm water and preparing an emulsion according to customary procedures by using the so formed emulsifying liquid, is rich in the stability.

When a monoamine, a diamine or a polyamine is used singly or a mixture of a monoamine and a diamine is used, the intended effect of the present invention cannot be attained at all. For example, when a monoamine is used singly, it is hardly dissolved or dispersed homogeneously in warm water. Further, when as asphalt emulsion is prepared by using an emulsifying liquid formed by adding a monobasic acid to a monoamine alone, the resulting emulsion is inferior in not only the storage stability but also the mechanical stability. When a monoamine is solubilized by combined use of a triamine, the emulsifying capacity to asphalts having a low penetration is enhanced, and there can be attained such advantages that the viscosity of the emulsion can be adjusted by an acid and the mechanical stability can be improved. However, this binary composition comprising a monoamine and a triamine is inferior to a ternary composition comprising a diamine in addition to the monoamine and triamine with respect to the emulsifying capacity. It was found that a ternary composition comprising a monoamine, a diamine and a triamine at the above-mentioned specific ratio defined by the present invention is most advantageous among ternary emulsifier compositions. The present invention has been completed based on this finding.

In compounds of the above general formulae (I), (II) and (III) or (IV) that are used in the present invention, R is derived from a saturated or unsaturated fatty acid having 8 to 22 carbon atoms or a mixture of such fatty acids. For example, beef tallow amines are amines having alkyl and alkenyl groups having the following number of carbon atoms determined depending on the fatty acid composition in beef tallow.

|  | Ratio (% by weight) |
| --- | --- |
| $C_{14}$ | 2– 8 |
| $C_{16}$ | 24–32 |
| $C_{18F}$ | 14–28 |
| $C_{18FF}$ | 39–50 |
| $C_{18}$ | 1– 5 |

Incidentally, F indicates that one double bond is contained, and FF indicates that two double bonds are contained.

When the ternary emulsifier is actually applied to production of an asphalt emulsion, a water-soluble monobasic acid is added to a composition comprising a monoamine, a diamine and a triamine according to the present invention, the mixture is incorporated into warm water maintained at 60° to 80° C. to form an emulsifier solution, and this emulsifier solution and a molten asphalt maintained at 120° to 150° C. are simultaneously passed through a colloid mill to form an asphalt emulsion.

The emulsifier of the present invention can be used in an amount of 0.1 to 10% by weight based on the above-mentioned emulsifier solution, but it is preferred that the emulsifier be used in an amount of 0.25 to 0.5% by weight based on the emulsifier solution.

The monobasic acid is used in an amount larger than the equivalent amount necessary for neutralizing the emulsifier, but it is generally preferred that the amount of the monobasic acid be about 3 times the equivalent amount necessary for neutralization.

As the monobasic acid, there can be used, for example, hydrochloric acid, perchloric acid, nitric acid, formic acid, acetic acid and monochloroacetic acid.

The amount of the asphalt in the asphalt emulsion may be 10 to 67% by weight, but in general, the amount of the asphalt is adjusted to 55 to 67% by weight.

When an asphalt emulsion is prepared by using the emulsifier of the present invention, it is preferred that at the emulsifying step, the temperature of the asphalt be 110° to 160° C., especially 120° to 150° C., and the temperature of the emulsifier solution (the composition comprising the emulsifier, the acid and water) be 30° to 80° C., especially 60° to 70° C.

An asphalt emulsion can be prepared by passing simultaneously the above-mentioned emulsifier solution and asphalt through an emulsifying machine such as a colloid mill.

In order to improve the storage stability and reducing the quantity of foams in the emulsion at the emulsifying step, it is possible to add a small amount of a polyvalent metal salt such as calcium chloride, iron chloride, aluminum chloride or the like in preparing the emulsion.

The present invention will now be described in detail by reference to the following Examples, in which all of "%" values are by weight.

EXAMPLE 1

Ternary amine compositions were prepared by mixing hardened beef tallow alkyl or beef tallow alkyl monoamines, propylene diamines and dipropylene polyamines at various mixing ratios, and with respect to each of these compositions, it was examined whether or not the composition was homogeneously dispersed in warm water and whether or not a transparent solution was obtained when hydrochloric acid and calcium chloride were added to the dispersion. These tests were conducted based on the judgement that if the so formed emulsifier solution is transparent and homogeneous, the quality of the resulting emulsion prepared by using this solution will be uniform and the emulsion will be homogeneous.

Obtained results are shown in Table 1.

Table 1

| Alkyl group | Mixing Ratio (% by weight) | | | | | | Average Number of Amino Groups | Hydration dispersion Test (1) | Dissolution Test (2) |
| --- | --- | --- | --- | --- | --- | --- | --- | --- | --- |
| | mono-amine | propylene diamine | dipropylene triamine | tripropylene tetraamine | tetrapropylene pentaamine | pentapropylene hexaamine | | | |
| hardened beef tallow | 40 | 55 | 5 | | | | 1.65 | X | X |
| hardened beef tallow | 40 | 50 | 10 | | | | 1.7 | Δ | Δ |
| hardened beef tallow | 40 | 40 | 20 | | | | 1.8 | | |
| hardened beef tallow | 50 | 45 | | 5 | | | 1.6 | X | X |
| hardened beef tallow | 50 | 40 | | 10 | | | 1.7 | Δ | Δ |
| hardened beef tallow | 50 | 30 | | 20 | | | 1.9 | | |
| hardened beef tallow | 60 | 35 | | | 5 | | 1.55 | X | X |
| hardened beef tallow | 60 | 30 | | | 10 | | 1.7 | Δ | Δ |
| hardened beef tallow | 60 | 20 | | | 20 | | 2.0 | | |
| hardened beef tallow | 70 | 25 | | | | 5 | 1.5 | X | X |
| hardened beef tallow | 70 | 20 | | | | 10 | 1.7 | Δ | Δ |
| hardened beef tallow | 70 | 10 | | | | 20 | 2.1 | | |
| beef tallow | 40 | 50 | 10 | | | | 1.7 | Δ | Δ |
| beef tallow | 40 | 40 | 20 | | | | 1.8 | | |
| beef tallow | 50 | 40 | | 10 | | | 1.7 | Δ | Δ |
| beef tallow | 50 | 30 | | 20 | | | 1.9 | | |
| beef tallow | 60 | 30 | | | 10 | | 1.7 | Δ | Δ |

Table 1-continued

| Alkyl group | mono-amine | propylene diamine | dipropylene triamine | tripropylene tetraamine | tetrapropylene pentaamine | pentapropylene hexaamine | Average Number of Amino Groups | Hydration dispersion Test (1) | Dissolution Test (2) |
|---|---|---|---|---|---|---|---|---|---|
| beef tallow | 60 | 20 | | | 20 | | 2.0 | | |
| beef tallow | 70 | 20 | | | | 10 | 1.7 | Δ | Δ |
| beef tallow | 70 | 10 | | | | 20 | 2.1 | | |

Note
(1) Hydration dispersion test: In a 1-liter capacity beaker was charged 900 g of warm water maintained at 65° C., and 11 g of the sample amine composition was added. The mixture was stirred for 3 minutes at a rate of 120 rpm by a stirring rod and the state of the aqueous solution was examined and evaluted according to the following scale:
    : homogeneously dispersed
Δ: slightly dispersed with floating masses
X: not dispersed
(2) Dissolution test: To the test solution used at the hydration dispersion test, which was maintained at 65° C., 13 g of 35% hydrochloric acid and 14 g of calcium chloride was added. The mixture was stirred for 3 minutes at a rate of 120 rpm by a stirring rod. The state of the aqueous solution was examined : transparent evaluated according to the following scale:
    : transparent solution
Δ: slightly opaque with floating masses
X: hardly dissolved From the results shown in Table 1, it will be apparent that homogeneous solutions can be obtained when the average number of amino groups is 1.7 or larger.

EXAMPLE 2

55 Parts by weight of a straight asphalt having a penetration of 150 to 200, which was heated and molten at 120° C., and 45 parts by weight of an emulsifier solution obtained by dissolving 0.4% of an emulsifier indicated in Table 2, 0.75% of 35% hydrochloric acid and 0.4% of $CaCl_2.2H_2O$ in warm water maintained at 65° C. were simultaneously passed through a colloid mill to prepare an asphalt emulsion. The emulsion was tested with respect to the storage stability, viscosity, sieve residue, evaporation residue and low temperature stability. Obtained results are shown in Table 2.

Table 2

| Alkyl Group | mono-amine | propylene diamine | dipropylene triamine | tripropylene tetraamine | tetrapropylene pentaamine | pentapropylene hexaamine |
|---|---|---|---|---|---|---|
| hardened beef tallow | 40 | 40 | 20 | | | |
| hardened beef tallow | 30 | 50 | 20 | | | |
| hardened beef tallow | 20 | 50 | 30 | | | |
| hardened beef tallow | 40 | 0 | 60 | | | |
| hardened beef tallow | 40 | 40 | | 20 | | |
| hardened beef tallow | 50 | 30 | | | 20 | |
| hardened beef tallow | 60 | 20 | | | | 20 |
| hardened beef tallow | | 100 | | | | |
| hardened beef tallow | | | 100 | | | |
| beef tallow | 40 | 50 | 10 | | | |
| beef tallow | 30 | 50 | 20 | | | |
| beef tallow | | 100 | | | | |

| Alkyl Group | Average Number of Amine Groups | Storage Stability (5 days) | Viscosity (Engler degree) | Sieve Residue (%) | Evaporation Residue (%) | Low Temperature Stability |
|---|---|---|---|---|---|---|
| hardened beef | | | | | | |

Table 2-continued

| | | | | | | |
|---|---|---|---|---|---|---|
| tallow hardened beef | 1.8 | 0.2 | 7.6 | 0.0 | 55.6 | pass |
| tallow hardened beef | 1.9 | 0.0 | 8.7 | 0.0 | 55.8 | pass |
| tallow hardened beef | 2.1 | 2.3 | 4.1 | 0.0 | 55.8 | pass |
| tallow hardened beef | 2.2 | 7.1 | 2.0 | 0.0 | 55.2 | pass |
| tallow hardened beef | 2.0 | 0.4 | 7.0 | 0.0 | 55.4 | pass |
| tallow hardened beef | 2.1 | 0.3 | 7.8 | 0.0 | 55.3 | pass |
| tallow hardened beef | 2.2 | 0.2 | 8.9 | 0.0 | 55.5 | pass |
| tallow hardened beef | 2.0 | 10.0 | 2.7 | 0.2 | 55.8 | pass |
| tallow beef | 3.0 | 15.0 | 2.2 | 0.1 | 55.6 | pass |
| tallow beef | 1.7 | 1.5 | 2.7 | 0.0 | 55.8 | pass |
| tallow beef | 1.9 | 1.5 | 2.7 | 0.0 | 56.6 | pass |
| tallow | 2.0 | 24.0 | 2.1 | 0.1 | 55.6 | pass |

From the data of the storage stability shown in Table 2, it will readily be understood that the ternary emulsifier of the present invention has a higher emulsifying capacity than a binary emulsifier comprising hardened (or unhardened) beef tallow alkyl monoamine and hardened (or unhardened) beef tallow alkyl dipropylene triamine, an emulsifier comprising hardened (or unhardened) beef tallow alkyl propylene diamine alone and an emulsifier comprising hardened (or unhardened) beef tallow alkyl dipropylene triamine alone.

cated in Table 3, 0.75% of 35% hydrochloric acid and 0.4% of CaCl$_2$.2H$_2$O in warm water maintained at 60° C. were simultaneously passed through a colloid mill to prepare an asphlat emulsion. The emulsion was tested with respect to the storage stability, viscosity, sieve residue, evaporation residue and low temperature stability. Obtained results are shown in Table 3, from which it will readily be understood that the emulsifier of the present invention has an excellent emulsifying capacity even to a hard asphalt having a low penetration.

Table 3

| Emulsifier | Average Number of Amino Groups | Storage Stability (5 days) | Viscosity (Engler degree) | Sieve Residue (%) | Evaporation Residue (%) | Low Temperature Stability |
|---|---|---|---|---|---|---|
| Emulsifier 1 of Present Invention | 1.9 | 0.3 | 12.7 | 0.0 | 56.2 | pass |
| Emulsifier 2 of Present Invention | 1.9 | 0.5 | 11.8 | 0.0 | 55.8 | pass |
| Emulsifier 3 of Present Invention | 1.9 | 0.7 | 10.4 | 0.0 | 56.0 | pass |
| Comparative Emulsifier 1 | 2 | 18.0 | 2.0 | 0.2 | 55.6 | pass |
| Comparative Emulsifier 2 | — | 23.8 | 1.9 | 0.4 | 56.1 | pass |
| Comparative Emulsifier 3 | — | 15.0 | 2.2 | 0.1 | 55.6 | pass |

Note
Emulsifier 1 of Present Invention: 3:5:2 mixture of hardened beef tallow monoamine, hardened beef tallow propylene diamine and hardened beef tallow dipropylene triamine
Emulsion 2 of Present Invention: 3:5:2 mixture of hardened beef tallow monoamine, hardened beef tallow propylene diamine and hardened beef tallow bis-aminopropyl amine
Emulsion 3 of Present Invention: 3:5:2 mixture of stearyl amine, stearyl ethylene diamine and stearyl diethylene triamine
Comparative Emulsifier 1: 1-heptadecyl-2-aminoethylimidazoline-2 alone
Comparative Emulsifier 2: aminated lignin alone
Comparative Emulsifier 3: stearyltrimethyl ammonium chloride alone

EXAMPLE 3

55 Parts by weight of a straight asphalt having a penetration of 80 to 100, which was heated and molten at 140° C., and 45 parts by weight of an emulsifier solution formed by dissolving 0.4% of an emulsifier indi-

EXAMPLE 4

55 Parts by weight of a straight asphalt having a penetration of 150 to 200, which was heated and molten at 120° C., and 45 parts by weight of an emulsifier solution prepared by dissolving an emulsifier in an amount indicated in Table 4, 35% hydrochloric acid in an amount indicated in Table 4 and 0.4% of CaCl$_2$.2H$_2$O in warm water maintained at 65° C. were simultaneously passed through a colloidal mill to prepare an asphalt emulsion. The emulsion was tested with respect to the storage stability, viscosity, sieve residue, evaporation residue and low temperature stability to obtain results shown in Table 4.

wherein R is the same as defined above, R' is ethylene or propylene and n' is an integer from 2 to 5, and compound having the formula

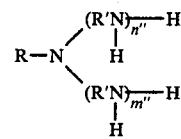

Table 4

| Emulsifier | Amount (%) of Emulsifier | Amount of Hydrochloric Acid[1] | Storage Stability (5 days) | Viscosity (Engler degree) | Sieve Residue (%) | Evaporation Residue (%) | Low Temperature Stability |
|---|---|---|---|---|---|---|---|
| Sample 1 of Present Invention | | | | | | | |
| hardened beef | | 1 | 22.2 | 2.5 | 0.0 | 56.0 | pass |
| tallow monoamine | 0.25 | 2 | 3.7 | 4.2 | 0.0 | 56.0 | pass |
| 30%, hardened | | 3 | 2.7 | 4.5 | 0.0 | 54.8 | pass |
| propylene diamine | | 1 | 3.2 | 3.0 | 0.0 | 54.5 | pass |
| 50%, and hardened | 0.3 | 2 | 1.8 | 5.0 | 0.0 | 54.5 | pass |
| dipropylene | | 3 | 1.2 | 4.9 | 0.0 | 54.2 | pass |
| triamine 20% | | 1 | 0.5 | 4.6 | 0.0 | 55.2 | pass |
| (average amino | 0.4 | 2 | 0.2 | 7.4 | 0.0 | 55.4 | pass |
| group number=1.9) | | 3 | 0.0 | 8.7 | 0.0 | 56.0 | pass |
| Sample 2 of Present Invention | | | | | | | |
| beef tallow mono- | | 1 | 26.5 | 2.4 | 0.0 | 55.6 | pass |
| amine 30%, beef | 0.25 | 2 | 7.3 | 2.4 | 0.0 | 55.8 | pass |
| tallow propylene | | 3 | 3.1 | 2.3 | 0.0 | 55.4 | pass |
| diamine 50%, and | | 1 | 12.9 | 2.2 | 0.0 | 56.0 | pass |
| beef tallow | 0.3 | 2 | 3.1 | 2.4 | 0.0 | 56.4 | pass |
| dipropylene tri- | | 3 | 2.8 | 2.4 | 0.0 | 56.0 | pass |
| amine 20% | | 1 | 2.8 | 2.5 | 0.0 | 56.8 | pass |
| (average amino | 0.4 | 2 | 1.7 | 2.5 | 0.0 | 55.6 | pass |
| group number=1.9) | | 3 | 1.5 | 2.7 | 0.0 | 56.6 | pass |
| Comparative Sample | | | | | | | |
| hardened beef | | 1 | 8.0 | 2.7 | 0.1 | 55.8 | pass |
| tallow propylene | 0.4 | 2 | 9.0 | 2.5 | 0.1 | 56.0 | pass |
| diamine alone | | 3 | 10.1 | 2.7 | 0.3 | 55.6 | pass |
| (average amino | | | | | | | |
| group number=2.0) | 0.5 | 3 | 5.0 | 2.7 | 0.0 | 56.0 | pass |

Note
[1] The molecular weight of the emulsifier was regarded as 335 in each run, and when hydrochloric acid was used in an amount of 2 gram-equivalents to the emulsifier, the amount used of hydrochloric acid was defined as 1.

From the results shown in Table 1, it will readily be understood that the emulsion 1 of the present invention is excellent in not only the point that the viscosity can be freely changed by adjusting the amount used of hydrochloric acid but also the point that it has a very high emulsifying capacity.

The embodiments of the invention in which an exclusive property or privilege is claimed are defined as follows:

1. An emulsifier composition for preparing an asphalt emulsion consisting essentially of a mixture of (1) monoamine having the formula RNH$_2$ wherein R is alkyl or alkenyl having 8 to 22 carbon atoms, (2) diamine having the formula

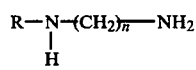

wherein R is the same as defined above and n is an integer of 2 or 3, and (3) polyamine having from 3 to 6 amino groups and selected from the group consisting of compound having the formula

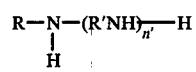

wherein R and R' are the same as defined above, and n" and m" are integers of from 1 to 4, the average number of amino groups in said composition being at least 1.7.

2. An emulsifier composition as claimed in claim 1, in which said monoamine is beef tallow amine, said diamine is beef tallow propylene diamine and said polyamine is selected from the group consisting of beef tallow dipropylene triamine, beef tallow tripropylene tetraamine, beef tallow tetrapropylene pentaamine and beef tallow pentapropylene hexaamine.

3. An emulsifier composition as claimed in claim 1 containing from 20 to 70 wt. % of said monoamine, from 10 to 55 wt. % of said diamine and from 5 to 30 wt. % of said polyamine.

4. An emulsifier composition as claimed in claim 1 containing about 30 wt. % of said monoamine, about 50 wt. % of said diamine and about 20 wt. % of said polyamine.

5. A transparent, homogeneous, aqueous emulsifier solution consisting essentially of from 0.1 to 10 wt. % of an emulsifier composition as claimed in claim 1, an amount of a water-soluble monobasic acid in excess of the amount necessary to neutralize said emulsifier composition, and the balance is essentially water.

6. A transparent, homogeneous emulsifier solution as claimed in claim 5 in which the amount of said emulsifier composition is from 0.25 to 0.5 wt. %.

7. An asphalt emulsion consisting essentially of from 10 to 67 wt. % of asphalt and the balance is an emulsifier solution as claimed in claim 5.

8. An asphalt emulsion consisting essentially of from 55 to 67 wt. % of asphalt and the balance is an emulsifier solution as claimed in claim 6.

9. An emulsifier composition for preparing an asphalt emulsion consisting essentially of (1) monoamine selected from the group consisting of octyl amine, lauryl amine, myristyl amine, palmityl amine, stearyl amine, oleyl amine, behenyl amine and beef tallow amine, (2) diamine selected from the group consisting of octyl propylene diamine, lauryl propylene diamine, myristyl propylene diamine, palmityl propylene diamine, stearyl propylene diamine, behenyl propylene diamine, beef tallow propylene diamine, lauryl ethylene diamine, myristyl ethylene diamine and stearyl ethylene diamine, and (3) polyamine selected from the group consisting of octyl dipropylene triamine, lauryl dipropylene triamine, myristyl dipropylene triamine, stearyl dipropylene triamine, behenyl dipropylene triamine, beef tallow dipropylene triamine, lauryl diethylene triamine, palmityl diethylene triamine, stearyl diethylene triamine, octyl bis-aminopropyl amine, lauryl bis-aminopropyl amine, myristyl bis-aminopropyl amine, stearyl bis-aminopropyl amine, behenyl bis-aminopropyl amine, beef tallow bis-aminopropyl amine, octyl tripropylene tetraamine, lauryl tripropylene tetraamine, myristyl tripropylene tetraamine, palmityl tripropylene tetraamine, stearyl tripropylene tetraamine, behenyl tripropylene tetraamine, oleyl tripropylene tetraamine, beef tallow tripropylene tetraamine, octyl triethylene tetraamine, lauryl triethylene tetraamine, myristyl triethylene tetraamine, palmityl triethylene tetraamine, stearyl triethylene tetraamine, behenyl triethylene tetraamine, oleyl triethylene tetraamine, beef tallow triethylene tetraamine, N-octylaminopropyl N'-bis-aminopropyl propylene diamine, N-laurylaminopropyl N'-bis-aminopropyl propylene diamine, N-myristylaminopropyl N'-bis-aminopropyl propylene diamine, N-palmitylaminopropyl N'-bis-aminopropyl propylene diamine, N-stearylaminopropyl N'-bis-aminopropyl propylene diamine, N-behenylaminopropyl N'-bis-aminopropyl propylene diamine, N-oleylaminopropyl N'-bis-aminopropyl propylene diamine, N-beef tallow-aminopropyl N'-bis-aminopropyl propylene diamine, octyl tetrapropylene pentaamine, lauryl tetrapropylene pentaamine, myristyl tetrapropylene pentaamine, palmityl tetrapropylene pentaamine, stearyl tetrapropylene pentaamine, behenyl tetrapropylene pentaamine, oleyl tetrapropylene pentaamine, beef tallow tetrapropylene pentaamine, octyl pentapropylene hexaamine, lauryl pentapropylene hexaamine, myristyl pentapropylene hexaamine, palmityl pentapropylene hexaamine, stearyl pentapropylene hexaamine, behenyl pentapropylene hexaamine, oleyl pentapropylene hexaamine and beef tallow pentapropylene hexaamine, the average number of amino groups in said composition being at least 1.7.

* * * * *